United States Patent
Spracklen et al.

(10) Patent No.: US 7,373,482 B1
(45) Date of Patent: May 13, 2008

(54) SOFTWARE-BASED TECHNIQUE FOR IMPROVING THE EFFECTIVENESS OF PREFETCHING DURING SCOUT MODE

(75) Inventors: Lawrence A. Spracklen, Boulder Creek, CA (US); Yuan C. Chou, Mountain View, CA (US); Santosh G. Abraham, Pleasanton, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 357 days.

(21) Appl. No.: 11/139,708

(22) Filed: May 26, 2005

(51) Int. Cl.
*G06F 9/30* (2006.01)
*G06F 9/40* (2006.01)
*G06F 15/00* (2006.01)

(52) U.S. Cl. .................................................... 712/207
(58) Field of Classification Search ................ 712/207; 717/130, 133, 159
See application file for complete search history.

(56) References Cited

U.S. PATENT DOCUMENTS

| | | | |
|---|---|---|---|
| 5,689,712 A * | 11/1997 | Heisch | 717/130 |
| 5,768,500 A * | 6/1998 | Agrawal et al. | 714/47 |
| 6,516,462 B1 * | 2/2003 | Okunev et al. | 717/154 |
| 2005/0251666 A1 * | 11/2005 | Chaudhry et al. | 712/228 |

OTHER PUBLICATIONS

Mutlu et al.; Runahead Execution: An Alternative to Very Large Instruction Windows for Out-of-order Processors; Feb. 2003; IEEE Computer Society; HPCA '03; pp. 129-140.*
Roth et al.; Dependence Based Prefetching for Linked Data Structures; 1998; ACM Press; ASPLOS '98 pp. 115-126.*
Collins et al.; Speculative Precomputation: Long-range Prefetching of Delinquent Loads; 2001; ACM Press; ISCA '01; pp. 14-25.*

* cited by examiner

*Primary Examiner*—Eddie Chan
*Assistant Examiner*—Corey S Faherty
(74) *Attorney, Agent, or Firm*—Park, Vaughan & Fleming LLP

(57) ABSTRACT

One embodiment of the present invention provides a system that improves the effectiveness of prefetching during execution of instructions in scout mode. During operation, the system executes program instructions in a normal-execution mode. Upon encountering a condition which causes the processor to enter scout mode, the system performs a checkpoint and commences execution of instructions in scout mode, wherein the instructions are speculatively executed to prefetch future memory operations, but wherein results are not committed to the architectural state of a processor. During execution of a load instruction during scout mode, if the load instruction is a special load instruction and if the load instruction causes a lower-level cache miss, the system waits for data to be returned from a higher-level cache before resuming execution of subsequent instructions in scout mode, instead of disregarding the result of the load instruction and immediately resuming execution in scout mode. In this way, the data returned from the higher-level cache can help in generating addresses for subsequent prefetches during scout mode.

16 Claims, 4 Drawing Sheets

FIG. 3A
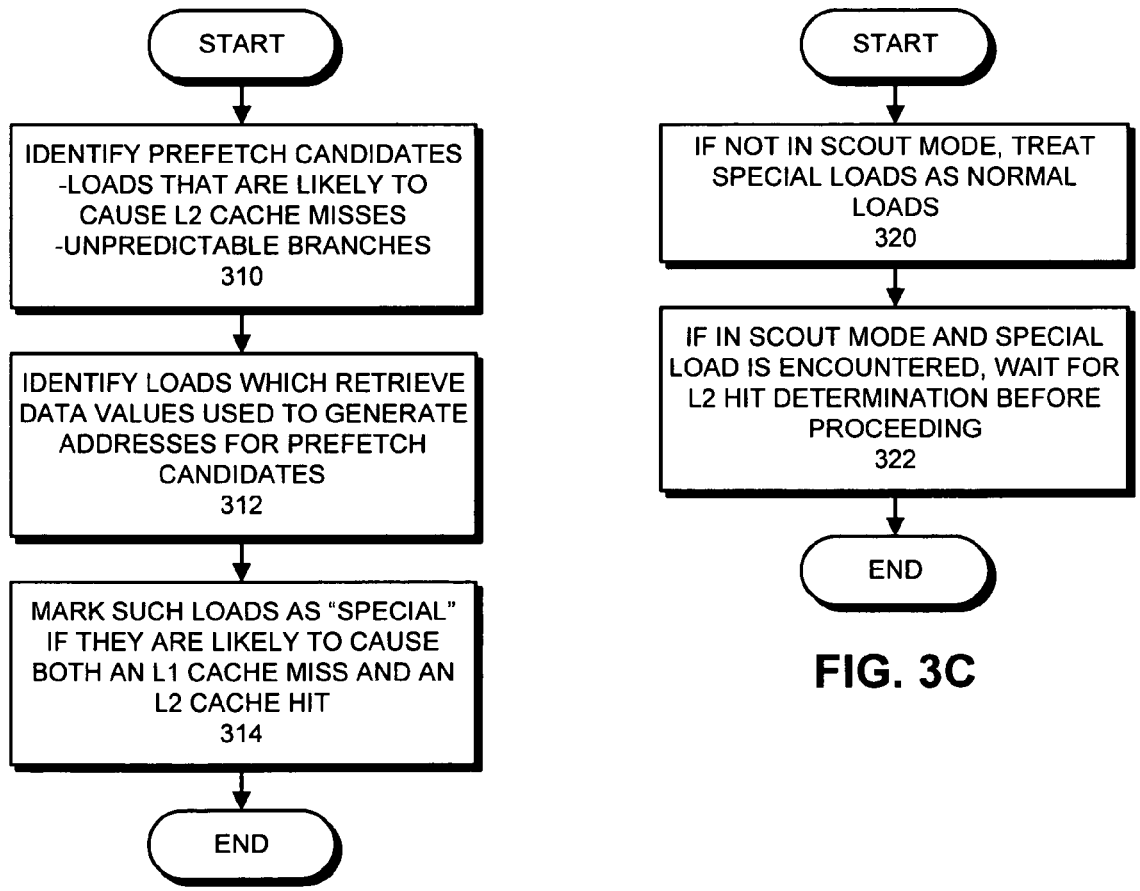
FIG. 3B
FIG. 3C

SOFTWARE-BASED TECHNIQUE FOR IMPROVING THE EFFECTIVENESS OF PREFETCHING DURING SCOUT MODE

RELATED APPLICATION

This application is related to a U.S. non-provisional application by the same inventors as the instant application, entitled, "Hardware-Based Technique for Improving the Effectiveness of Prefetching during Scout Mode," filed on 26 May 2005 U.S. patent application Ser. No. 11/139,866.

BACKGROUND

1. Field of the Invention

The present invention relates to techniques for improving computer system performance. More specifically, the present invention relates to a method and an apparatus for improving the effectiveness of prefetching during scout mode by selectively waiting for specific load misses to return from L2 cache during scout mode.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

When a memory reference, such as a load operation, generates a cache miss, the subsequent access to level-two (L2) cache or to main memory can require dozens or hundreds of clock cycles to complete, during which time the processor is typically idle, performing no useful work.

A number of techniques are presently used (or have been proposed) to hide this cache-miss latency. Some processors support out-of-order execution, in which instructions are kept in an issue queue, and are issued "out-of-order" when operands become available. Unfortunately, existing out-of-order designs have a hardware complexity that grows quadratically with the size of the issue queue. Practically speaking, this constraint limits the number of entries in the issue queue to one or two hundred, which is not sufficient to hide memory latencies as processors continue to get faster. Moreover, constraints on the number of physical registers that can be used for register renaming purposes during out-of-order execution also limit the effective size of the issue queue.

Some processor designers have proposed entering a "scout mode" to hide the cache-miss latency. If the processor encounters a stall condition, such as a cache miss, instead of waiting for the cache miss to be resolved, the processor generates a checkpoint and enters scout mode. In scout mode, instructions are speculatively executed to prefetch future memory operations, but results are not committed to the architectural state of the processor. When the stall condition is finally resolved, the system uses the checkpoint to resume execution in normal-execution mode from the instruction that originally encountered the stall condition. By allowing the processor to continue to perform prefetches during stall conditions, scout mode can significantly increase the amount of work the processor completes.

Unfortunately, proposed systems that use scout mode do not always achieve optimal performance. In particular, during scout mode it is not always beneficial to continue executing instructions when a load misses in the L1 cache. In some cases, it may be better to wait for the corresponding load value to return from the L2 cache before resuming execution in scout mode because the load value may be used in computing addresses to be prefetched. If the system does not wait for such load values to return, the system will not prefetch these addresses, which can lead to suboptimal performance.

Hence, what is needed is a method and an apparatus for executing instructions in scout mode without the above-described performance problem.

SUMMARY

One embodiment of the present invention provides a system that improves the effectiveness of prefetching during execution of instructions in scout mode. During operation, the system executes program instructions in a normal-execution mode. Upon encountering a condition which causes the processor to enter scout mode, the system performs a checkpoint and commences execution of instructions in scout mode, wherein the instructions are speculatively executed to prefetch future memory operations, but wherein results are not committed to the architectural state of a processor. During execution of a load instruction during scout mode, if the load instruction is a special load instruction and if the load instruction causes a lower-level cache miss, the system waits for data to be returned from a higher-level cache before resuming execution of subsequent instructions in scout mode, instead of disregarding the result of the load instruction and immediately resuming execution in scout mode. In this way, the data returned from the higher-level cache can help in generating addresses for subsequent prefetches during scout mode.

In a variation on this embodiment, a special load instruction is: (1) a load instruction which has a different bit pattern than a normal load instruction; (2) a load instruction which is located within a section of code that is marked as special; or (3) a load instruction which is executed during a time when process state information indicates that the load instruction is to be treated as a special load instruction.

In a variation on this embodiment, while executing the instructions, the system modifies an executable file for the program so that selected loads will be executed as special loads. This modification process can involve: identifying prefetch candidates, including loads which are likely to cause higher-level cache misses and unpredictable branches; identifying prefetch-candidate-address loads, which are loads that retrieve data values used to generate addresses for the prefetch candidates; and marking prefetch-candidate-address loads as a special loads if the prefetch-candidate-address loads are likely to cause both a lower-level cache miss and a higher-level cache hit.

In a variation on this embodiment, executing instructions involves keeping track of data dependencies to facilitate determining if an instruction is subject to an unresolved data dependency.

In a further variation, keeping track of data dependencies involves: maintaining a "not-there" bit for each register, which indicates whether or not a value to be stored in a register by a preceding instruction is subject to an unresolved data dependency and is consequently not available.

When executing an instruction during scout mode, the system sets the not-there bit for the destination register of the instruction if a value to be stored in the destination register is "not-ready," or if any source operand of the instruction is not-there.

In a variation on this embodiment, after the launch condition is finally resolved, the system uses the checkpoint to resume execution in normal-execution mode from the instruction that originally encountered the launch condition This launch condition can include: a data-dependent stall condition, or a non-data-dependent stall condition.

Another embodiment of the present invention provides a system that improves the effectiveness of prefetching during execution of instructions in scout mode. Upon encountering a non-data dependent stall condition, the system performs a checkpoint and commences execution of instructions in scout mode, wherein instructions are speculatively executed to prefetch future memory operations, but wherein results are not committed to the architectural state of a processor. When the system executes a load instruction during scout mode, if the load instruction causes a lower-level cache miss, the system allows the load instruction to access a higher-level cache. Next, the system places the load instruction and subsequent dependent instructions into a deferred queue, and resumes execution of the program in scout mode. If the load instruction ultimately causes a hit in the higher-level cache, the system replays the load instruction and subsequent dependent instructions in the deferred queue, whereby the value retrieved from the higher-level cache can help in generating prefetches during scout mode.

In a variation on this embodiment, when additional space is required in the deferred queue during scout mode, the system eliminates the oldest instructions entered into the deferred queue during scout mode.

In a variation on this embodiment, if instructions associated with previous checkpoints exist in the deferred queue, and if there is insufficient space in the deferred queue for storing deferred instructions during scout mode, the system purges instructions associated with one or more checkpoints from the deferred queue to make room for storing deferred instructions.

In a variation on this embodiment, if the system encounters an unresolved data dependency while executing an instruction during normal-execution mode, the system generates a checkpoint and executes subsequent instructions in an execute-ahead mode. During execute-ahead mode, instructions that cannot be executed because of an unresolved data dependency are deferred, and other non-deferred instructions are executed in program order.

In a further variation, if the unresolved data dependency is resolved during execute-ahead mode, the system executes deferred instructions in a deferred mode. If all deferred instructions are executed during deferred mode, the system returns to the normal-execution mode to resume normal program execution from the point where the execute-ahead mode left off. On the other hand, if some deferred instructions are deferred again, the system returns to execute-ahead mode at the point where execute-ahead mode left off.

In a variation on this embodiment, when the unresolved data dependency or the non-data dependent stall condition that originally caused the processor to leave normal-execution mode is finally resolved, the system uses the checkpoint to resume execution in normal-execution mode from the instruction that originally caused the processor to leave normal-execution mode.

BRIEF DESCRIPTION OF THE FIGURES

FIG. 3A illustrates a run-time optimizer in accordance with an embodiment of the present invention.

FIG. 3B presents a flow chart illustrating how the run-time optimizer marks specific load instructions in accordance with an embodiment of the present invention.

FIG. 3C presents a flow chart illustrating how special load instructions are executed in accordance with an embodiment of the present invention.

Table 1 illustrates exemplary code from a life sciences application in accordance with an embodiment of the present invention.

Table 2 illustrates en exemplary loop body in accordance with an embodiment of the present invention.

Table 3 illustrates how loads are marked in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Processor

Figure 1A:
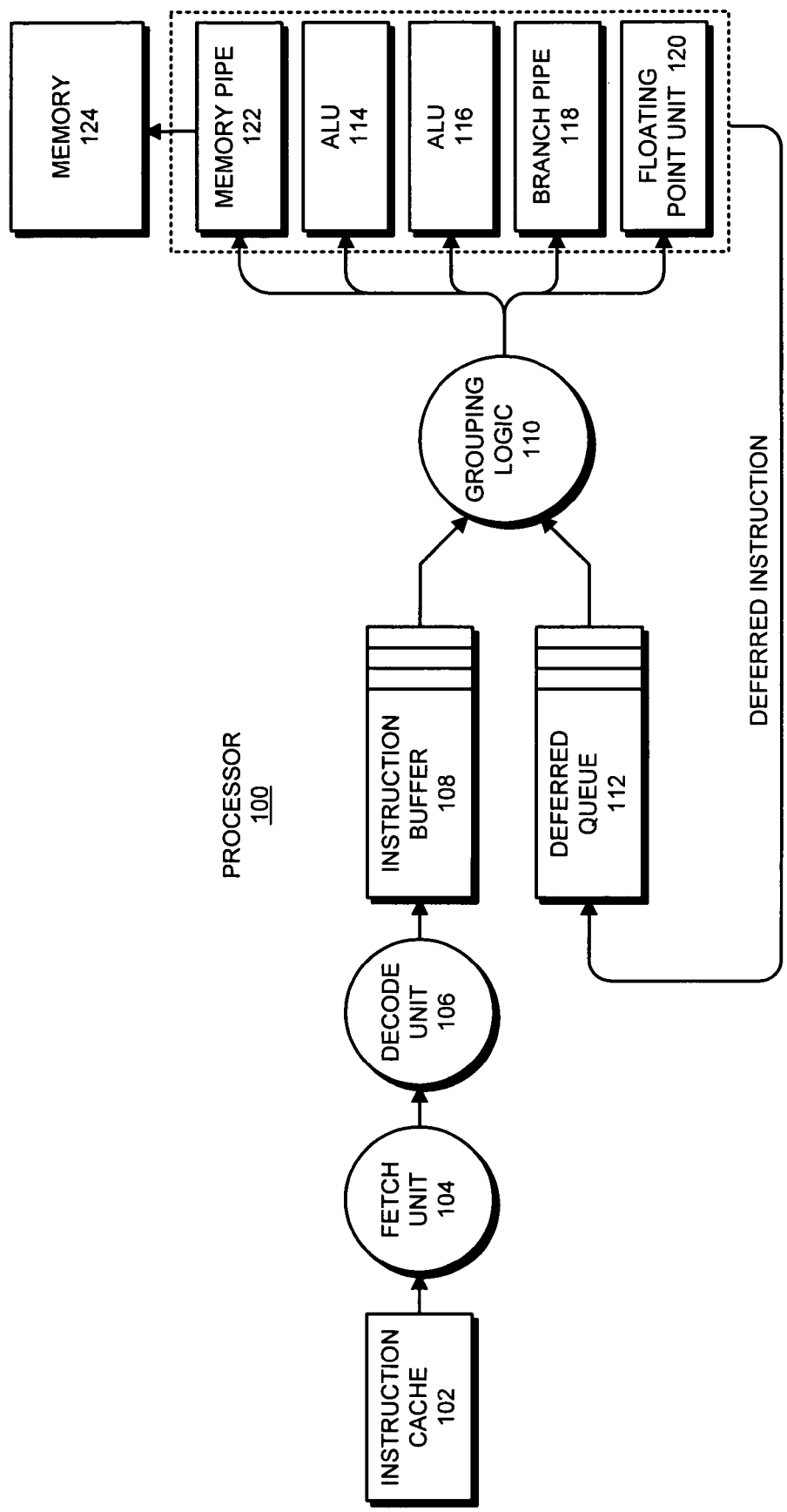
FIG. 1A illustrates a processor in accordance with an embodiment of the present invention.

FIG. 1A illustrates the design of a processor 100 in accordance with an embodiment of the present invention. Processor 100 can generally include any type of processor, including, but not limited to, a microprocessor, a mainframe computer, a digital signal processor, a personal organizer, a device controller and a computational engine within an appliance. As is illustrated in FIG. 1, processor 100 includes instruction cache 102, fetch unit 104, decode unit 106, instruction buffer 108, deferred queue 112, grouping logic 110, memory 124, arithmetic logic unit (ALU) 114, ALU 116, branch pipe 118 and floating point unit 120.

During operation, fetch unit 104 retrieves instructions to be executed from instruction cache 102, and feeds these instructions into decode unit 106. Decode unit 106 forwards the instructions to be executed into instruction buffer 108, which is organized as a FIFO buffer. Instruction buffer 108 feeds instructions in program order into grouping logic 110, which groups instructions together and sends them to execution units, including memory pipe 122 (for accessing memory 124), ALU 114, ALU 116, branch pipe 118 (which resolves conditional branch computations), and floating point unit 120.

If an instruction cannot be executed due to an unresolved data dependency, such as an operand that has not returned from a load operation, the system defers execution of the instruction and moves the instruction into deferred queue 112. Note that like instruction buffer 108, deferred queue 112 is also organized as a FIFO buffer.

When the data dependency is eventually resolved, instructions from deferred queue 112 are executed in program order with respect to other deferred instructions, but not with respect to other previously executed non-deferred instructions. This process is described in more detail below with reference to FIG. 2.

Keeping Track of Dependencies

The present invention keeps track of data dependencies to facilitate determining if an instruction is subject to an unresolved data dependency. In one embodiment of the present invention, this can involve maintaining state information for each register, which indicates whether or not a value in the register depends on an unresolved data dependency.

Figure 1B:
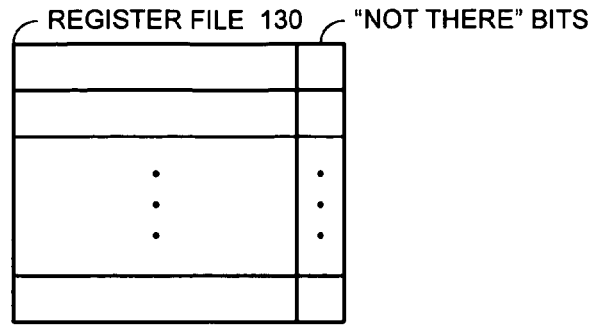
FIG. 1B illustrates a register file in accordance with an embodiment of the present invention.

For example, FIG. 1B illustrates a register file 130 in accordance with an embodiment of the present invention. Each register in register file 130 is associated with a "not-there" bit, which keeps track of whether a valid operand value is contained in the register, or if the operand cannot be produced because of an unresolved data dependency. For example, if the register is waiting for an operand to return from a load operation, the corresponding not-there bit is set to indicate that the desired operand value is not present in the register. When a subsequent instruction references a source operand value that is marked as not-there, and generates a result that is stored in a destination register, the system marks the destination register as not-there to indicate that the value in the destination register also depends on the unresolved data-dependency. This can be accomplished by marking the not-there bit of the destination register with the "OR" of the not-there bits for source registers of the instruction.

State Diagram

Figure 2:
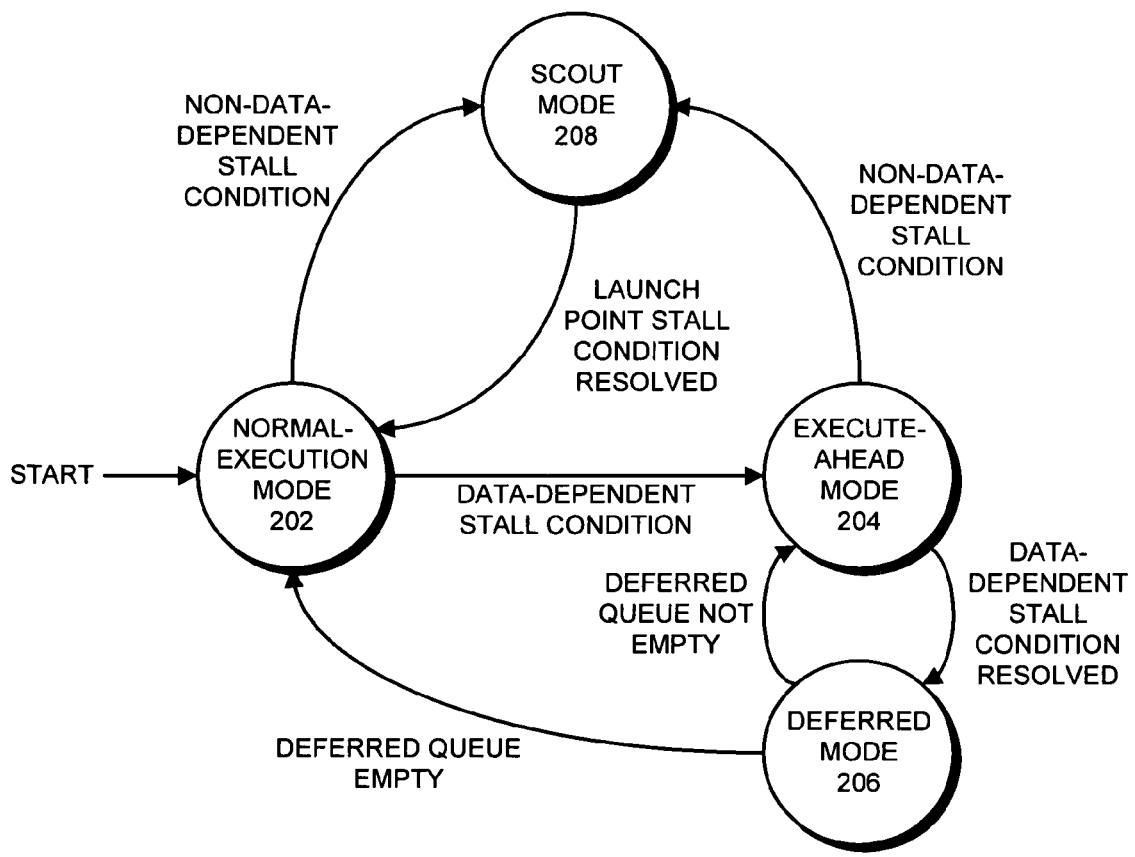
FIG. 2 presents a state diagram for a processor in accordance with an embodiment of the present invention.

FIG. 2 presents a state diagram which includes the execute-ahead mode in accordance with an embodiment of the present invention. The system starts in normal execution mode 202, wherein instructions are executed in program order as they are issued from instruction buffer 108 (see FIG. 1).

Next, if an unresolved data dependency arises during execution of an instruction, the system moves to execute-ahead mode 204. An unresolved data dependency can include: a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; and a use of an operand that depends on another operand that is subject to an unresolved data dependency.

While moving to execute-ahead mode 204, the system performs a checkpointing operation to generate a checkpoint that can be used, if necessary, to return execution of the process to the point where the unresolved data dependency was encountered; this point is referred to as the "launch point." (Note that generating the checkpoint can involve saving the precise architectural state of the processor to facilitate subsequent recovery from exceptions that arise during execute-ahead mode or deferred mode.) The system also "defers" execution of the instruction that encountered the unresolved data dependency, and stores the deferred instruction in deferred queue 112.

Within execute-ahead mode 204, the system continues to execute instructions in program order as they are received from instruction buffer 108, and any instructions that cannot execute because of an unresolved data dependency are stored in deferred queue 112.

When the system is in execute-ahead mode 204, if an unresolved data dependency is finally resolved, the system moves into deferred mode 206, wherein instructions are executed in program order from deferred queue 112. During deferred mode 206, the system attempts to execute deferred instructions from deferred queue 112. Note that the system attempts to execute these instructions in program order with respect to other deferred instructions in deferred queue 112, but not with respect to other previously executed non-deferred instructions (and not with respect to deferred instructions executed in previous passes through deferred queue 112). During this process, the system defers execution of deferred instructions that still cannot be executed because of unresolved data dependencies and places these again-deferred instruction back into deferred queue 112. The system executes the other instruction that can be executed in program order with respect to each other.

After the system completes a pass through deferred queue 112, if deferred queue 112 is empty, the system moves back into normal execution mode 202. This may involve committing changes made during execute-ahead mode 204 and deferred mode 206 to the architectural state of the processor, if such changes have not been already committed. It can also involve throwing away the checkpoint generated when the system moved into execute-ahead mode 204.

On the other hand, if deferred queue 112 is not empty after the system completes a pass through deferred queue 112, the system returns to execute ahead mode to execute instructions from instruction buffer 108 from the point where the execute-ahead mode 204 left off.

If a non-data dependent stall condition arises while the system is in normal execution mode 202 or in execute-ahead mode 204, the system moves into scout mode 208. (This non-data-dependent stall condition can include: a memory barrier operation; a load buffer full condition; a store buffer full condition, or a deferred queue full condition.) In scout mode 208, instructions are speculatively executed to prefetch future memory operations, but results are not committed to the architectural state of the processor.

Scout mode is described in more detail in U.S. patent application Ser. No. 10/741,944, entitled, "Generating Prefetches by Speculatively Executing Code Through Hardware Scout Threading," by inventors Shailender Chaudhry and Marc Tremblay (filed 19 Dec. 2003). This application is hereby incorporated by reference herein to provide details on how scout mode operates.

Unfortunately, computational operations performed during scout-ahead mode need to be recomputed again, which can require a large amount of computational work.

When the original "launch point" stall condition is finally resolved, the system moves back into normal-execution mode 202, and, in doing so, uses the previously generated checkpoint to resume execution from the launch point instruction (the instruction that initially encountered the stall condition).

Note that the launch point stall condition is the stall condition that originally caused the system to move out of normal execution mode 202. For example, the launch point stall condition can be the data-dependent stall condition that caused the system to move from normal execution mode 202 to execute-ahead mode 204, before moving to scout mode 208. Alternatively, the launch point stall condition can be the non-data-dependent stall condition that caused the system to move directly from normal execution mode 202 to scout mode 208.

Improving the Effectiveness of Prefetching During Scout Mode

In scout mode it is beneficial to make forward progress down the predicted path of execution as fast as possible in order to maximize the number of subsequent missing loads that are discovered and to prefetch these loads as early as possible in order to maximize the timeliness of the prefetches.

This involves making tradeoffs. In most modern processors there are two levels of on-chip cache, the small level-one (L1) cache, with an access time of a few cycles and the larger level-two (L2) cache with an access time an order of magnitude longer. As a result, when the use of an outstanding load is encountered during scout mode, the processor has a couple of options. The processor can wait to see if the load hits in the L2 cache. Alternatively, the processor can immediately set the destination register of the load to not-there and continue.

There are benefits and disadvantages to either approach: if the scout mode waits the 20 or more cycles to ascertain whether the load hit in the L2 cache, the distance scout mode can progress before the triggering load returns is reduced, potentially reducing the number of cache missing loads that can be discovered. However, if the scout mode waits and the load hits in the L2 cache, the result of that load is now available and subsequent instructions (including loads) which are dependent on the result of the load can be issued, rather than being skipped and their results set to not-there.

In current-art in-order processors, the decision is usually to wait to ascertain if the load hits in the L1 cache, but not to wait until a determination can be made about whether the load hit in the L2 cache. In this way, the system tries to make as much forward progress as possible during the period the launch point load is outstanding.

This usually provides good performance, unless the code contains a lot of dependent loads, such as those typically encountered in pointer-chasing code. For example, in life sciences, code such as the following in Table 1 is common:

TABLE 1

```
do {
    sum += Matrix[(int) *q][(int) *s];
    q++; s++;
} while (sum >= 0 && sum1 >= X);
```

The sequence of instructions for the body of the main loop look what appears in Table 2 below.

TABLE 2

| load r1, [q] | !L2 hit |
| load r2, [s] | !L2 hit |
| mulx r1, num_columns, r1 | |
| sllx r2, 2, r2 | |
| add r1, r2, r1 | |
| load r2, [r1] | !L2 Miss |
| add sum, r2, sum | |
| add q, 4, q | |
| add s, 4, s | |

In many life sciences applications, the array Matrix is too large to fit in the L2 cache, while the q and s arrays are too large to fit in the L1 cache, but will fit in the L2 cache.

In scout mode, if the processor does not wait until loads that hit in the L2 cache resolve, the processor will prefetch subsequent elements of q and s from the L2 cache into the L1 cache. However, the processor will fail to issue a single prefetch for subsequent elements of matrix array which miss in the L2 cache, because the addresses of these elements will be set to "not-there" since they depend on the results of the prior L2 cache hits.

However, if the processor waits until it is determined that a load hits in the L2 cache, during the time that the initial L2 cache miss that triggered scout is being serviced, the L2 cache misses for many subsequent iterations can be prefetched. This can significantly improve the performance of the code, because the access time for memory is an order of magnitude longer than that of the L2 cache.

This dilemma leads to the following problem. For certain code sequences, making the most rapid forward progress is the key to good scout mode performance. However, in other code sequences, in which loads that hit in the L2 cache feed into subsequent missing memory operations (as observed in many pointer chasing codes), improved scouting fidelity (i.e. waiting for L2 cache hits to resolve) is of utmost importance.

Waiting for the use of ALL loads that miss L1 cache in order to ascertain whether they hit in the L2 cache will curtail the distance traversed during scout mode to an unacceptable degree in many instances. Furthermore, in many cases, if the results of these loads don't affect: (1) program flow (i.e. dictate branch direction); or (2) address generation of subsequent missing memory operations (loads, stores, prefetches etc), then there will be no benefit to waiting for these loads to resolve.

However, in some common code sequences, not waiting until these loads resolve will significantly reduce the ability of scout mode to prefetch for subsequent missing loads (as previously illustrated), or to follow the correct execution path.

The deciding factor is whether the results of the loads which miss in the L1 cache, but hit in the L2 cache are used: (1) to generate the addresses for subsequent missing loads or (2) to determine the outcome of difficult-to-predict conditional branches. In these situations, it makes sense to wait for the L2 cache hitting loads to resolve.

In essence, unlike proposed scout mode implementations, which either NEVER wait for L2 cache hits or possible implementations that ALWAYS wait for L2 cache hits, we desire a scheme that can either: (1) adapt its behavior to requirements of different applications; or (2) achieve rapid forward progress, while still capturing the benefits of resolving L2 cache hitting loads.

In the following sections, we describe both a software and hardware schemed through which this flexibility can be achieved:

Software Scheme

Optimizing compilers or run-time optimizers (RTO) can readily determine the best scouting behavior for different code sequences, as they are aware of the inter-instruction dependencies and have knowledge about were loads are likely to hit in the cache hierarchy. For example, FIG. 3A illustrates an embodiment of the present invention in which an executable file 302 for a program is fed into an RTO 304, which produces modified executable file 306. This modified executable file contains information that indicates which scouting behavior is best suited to difference portions of the program. This can be facilitated by an instruction set architecture (ISA) extension which enables the compiler or RTO to indicate to the hardware which scouting behavior is best suited to different portions of the application. This information can be readily communicated on either an instruction-level granularity, or at a coarser region-wide granularity.

For the instruction-level granularity, a special type of load instruction or a new load ASI can be used by the compiler or RTO to indicate to the processor that this load (1) is likely to hit in the L2 cache and (2) produces a result that is used to generate the address of subsequent missing memory operations (loads, stores or even prefetches) or is used to dictate the outcomes of subsequent conditional branches.

Referring to FIG. 3B, the compiler or RTO can accomplish this by first identifying prefetch candidates, such as loads that are likely to cause L2 cache misses or unpredictable branches (step 310). The system then identifies loads which retrieve data values used to generate addresses for these prefetch candidates (step 312). Next, the system marks such loads if they are likely to cause both and L1 cache miss and an L2 cache hit (step 312). Note that determining the likelihoods of cache misses and cache hits can be accomplished using mechanisms that are commonly available in an RTO.

Referring to FIG. 3C, when a processor in normal-execution mode encounters this type of load, it treats the load as a normal load (step 320). However, then a process in scout mode encounters this type of marked load, it knows that the compiler believes that the result of the load will be required to facilitate accurate scouting. As a result, upon use of the load, the processor waits until it is ascertained whether the load hit in the L2 cache before proceeding (step 322). On the other hand, for unmarked loads, the processor only waits until it can ascertain whether the load will miss in the L1 cache.

In this discussion, we assume that during scout mode the processor normally only waits to ascertain if a load hits in the L1 cache before continuing. As a result, the effect of the marked loads is to force the processor to wait until it is determined whether the load hit in the L2 cache. (Note that for systems which normally wait for L2 cache hits, an alternative marking scheme for loads can be used to indicate to the processor that the result of this load is unimportant for scouting and that there is no need to wait for an L2 cache hit, thereby allowing faster progress.)

Returning to the prior example, the first two loads would be marked, because their results are used to compute the address for the third missing load. The third load would not be marked because (1) its result is not used for subsequent address computations, and (2) it is deemed likely to miss in the L2 cache (see Table 3).

TABLE 3

```
load r1, [q]              !L2 --- hit MARK
load r2, [s]              !L2 --- hit MARK
mulx r1, num_columns, r1
sllx r2, r2, r2
add r1, r2, r1    !waits until r1, r2 resolved
load r2, [r1]             !L2 Miss
add sum, r2, sum
add q, 4, q
add s, 4, s
```

By using this approach, the processor can still make rapid progress in scout mode when the results of L1 cache missing loads are not required to improve the effectiveness of scouting. However, when the processor is informed by the compiler of important loads that are predicted to hit in the L2 cache, the processor waits for the important loads, thereby trading forward progress for improved fidelity.

Region granularity can be implemented similarly to instruction granularity, but the desired scout behavior is dictated for larger blocks of code. For instance, in the first example, on entry to the while loop, the processor would be asked to wait until loads are known to miss in the L2 cache. On exit from the while loop, the behavior would be reset to its standard form. This communication would be achieved via the use of special instructions inserted around the while loop by the compiler or the RTO.

Another potential region granularity scheme is to specify that the processor should wait for integer loads and not wait for floating point loads.

Hardware Scheme

Scouting can be paired with other aggressive performance enhancement techniques which can continue speculatively executing even in the presence of the use of outstanding memory requests (execute-ahead and continual flow pipeline (CFP) are examples of such schemes). Henceforth, these performance-enhancement techniques are collectively referred to as "execute-ahead."

In processors that support both execute-ahead mode and scout mode, one variation of the present invention provides a novel enhancement to scouting which allows rapid forward progress and increased scouting effectiveness.

This variation uses the deferred queue to hold instructions which depend on loads that miss L1 cache and, then, if these loads hit in the L2 cache, the dependent instructions are replayed from the deferred queue.

Using this novel scheme, a processor executing in scout mode needs only to wait until it can determine that a load missed in the L1 cache. At this point, the processor can continue. Note that the load and all dependent, currently unexecutable, instructions are placed in to the deferred queue, and the processor continues execution with the first independent instructions.

Note that instructions do not have to stay in the deferred queue for very long. Once the load's outcome from L2 is known (either hit or a miss), the load and its dependents can be removed from the deferred queue and other structures. Furthermore, to ensure that scouting cannot be stalled by a full deferred queue, unlike execute-ahead mode (where there is a requirement to keep all deferred instructions), the deferred queue is free to over-flow rather than trying to retain ALL deferred instructions. In scout mode, the deferred queue can be viewed as a history buffer containing only the N most-recent deferred instructions. As a result, if a load has not returned before its dependent instructions reach the tail of the deferred queue, those instructions will still be evicted from the deferred queue once another sequence of deferred instructions is encountered.

Figure 4:
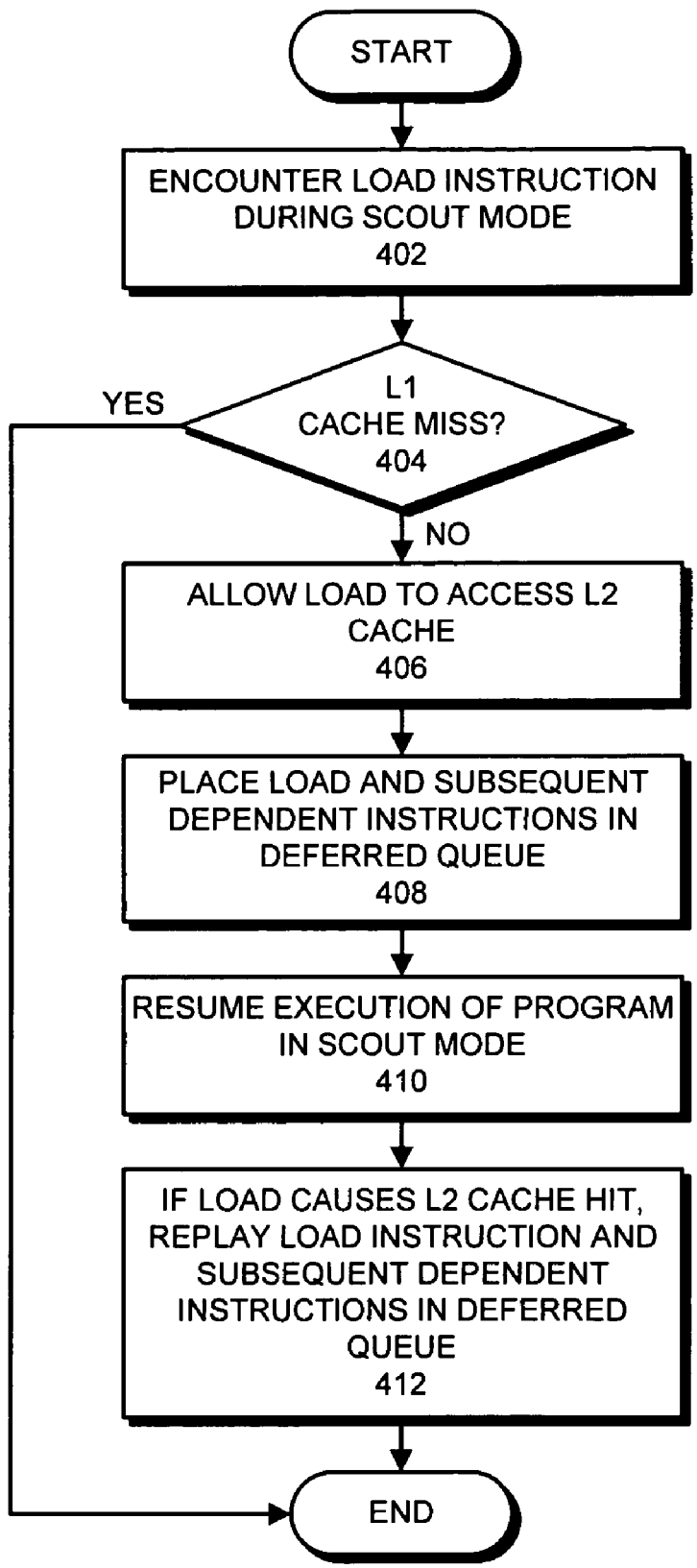
FIG. 4 presents a flow chart illustrating how a deferred queue can be used to store loads and dependent instructions during scout mode in accordance with an embodiment of the present invention.

Referring to FIG. 4, this system generally operates as follows. During execution of a program, the system encounters a load instruction during scout mode (step 402). Next, the system determines if the load causes an L1 cache miss (step 404). If so, the system allows the load to access the L2 cache (step 406) and also places the load and subsequent dependent instructions in the deferred queue (step 408). The system then resumes execution of subsequent non-dependent instructions in scout mode (step 410).

Next, if the missing load which caused the deferral hits in the L2 cache, when the load returns, the deferred queue is replayed and its dependent instructions are now executed (step 412). If the L2-cache-hitting load feeds subsequent missing memory operations, these are now effectively prefetched, improving the effectiveness of scout mode. If the missing load which caused the deferral miss in the L2 cache, the scout thread continues, and either: (1) the load's dependent instructions are eventually evicted from the deferred queue to make room for younger deferred instructions; or (2) the dependent instructions are purged from the deferred queue as soon as it is known that the load missed in the L2 cache.

In this way, scout mode continues to make rapid progress down the instruction stream, but gains the increased effectiveness associated with resolving L2 cache hitting loads.

In the situation where execute-ahead results are discarded prior to transitioning to scout mode, the scout is free to utilize all of the deferred queue. However, if execute-ahead checkpoints its state prior to transitioning to scout, the entries in the deferred queue are required to recover to the checkpoint once scout terminates. However, scout does not need many deferred queue entries in order to be effective. As a result, if the deferred queue is not full, scout can function effectively by using the remaining entries.

If the deferred queue is full, we propose the following. First, the processor should determine whether there is sufficient time remaining before the predicted return of the launch condition load to make it worth transitioning into the high-fidelity scout mode. If it is likely that only a short period of time remains before the trigger load returns, the processor can choose to transition to standard scout mode, which does not require deferred queue resources.

Otherwise, if execute-ahead has several associated checkpointed states, the most recent can be rolled back. This roll-back releases the entries in the deferred queue that correspond to deferred instructions subsequent to the previous checkpoint. This enables scout mode to use these freed entries. Under these conditions, some of the progress achieved by execute-ahead is traded to improve the effectiveness of scouting.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art.

For example, although this specification discusses the invention in the context of an in-order processor, the same enhancements can also be applied to an out-of-order processor. During scout mode in an out-of-order processor, L2 missing loads are converted to prefetches and pseudo-retired in order to free up resources in the issue window, reorder buffer, load buffer etc. If some of these resources are fully utilized due to a L1-missing/L2-hitting load, then scout mode progress is slowed down and it may be more effective to treat these loads similarly to L2 missing loads.

Furthermore, the term "higher-level cache" refers to a larger cache with a longer access time, which is located closer to memory. For example, an L2 cache is a higher-level cache for an L1 cache, and an L3 cache is a higher-level cache for an L2 cache. Similarly, a "lower-level" cache refers to a smaller cache with a shorter access time, which is located closer to the processor. For example, an L1 cache is a lower-level cache for an L2 cache, and an L2 cache is a lower-level cache for an L3 cache.

Additionally, the above disclosure is not intended to limit the present invention. The scope of the present invention is defined by the appended claims.

What is claimed is:

1. A method for improving the effectiveness of prefetching during execution of instructions in scout mode, wherein the instructions are speculatively executed to prefetch future memory operations, but wherein results are not committed to the architectural state of a processor, the method comprising:
    executing instructions for a program during a normal-execution mode;
    modifying an executable file for the program so that selected loads will be executed as special loads, wherein modifying the executable file involves:
        identifying prefetch candidates, including loads which are likely to cause higher-level cache misses and unpredictable branches;
        identifying prefetch-candidate-address loads, which are loads that retrieve data values used to generate addresses for the prefetch candidates; and
        marking prefetch-candidate-address loads as a special load if the prefetch-candidate-address loads are likely to cause both a lower-level cache miss and a higher-level cache hit;
    upon encountering a condition which causes the processor to enter scout mode, performing a checkpoint and commencing execution of instructions in scout mode; and
    wherein during execution of a load instruction during scout mode,
        if the load instruction is a special load instruction and if the load instruction causes a lower-level cache miss, the method further comprises waiting for data to be returned from a higher-level cache before resuming execution of subsequent instructions in scout mode, instead of disregarding the result of the load instruction and immediately resuming execution in scout mode, whereby the data returned from the higher-level cache can help in generating prefetches during scout mode; and
        if the load instruction is not a special load instruction, the method further comprises waiting for data to be returned from a lower-level cache before resuming execution of subsequent instructions in scout mode.

2. The method of claim 1, wherein a special load instruction is:
    a load instruction which has a different bit pattern than a normal load instruction;
    a load instruction which is located within a section of code that is marked as special; or
    a load instruction which is executed during a time period when process state information indicates that the load instruction is to be treated as a special load instruction.

3. The method of claim 1, wherein only integer loads and not floating point loads are marked as special, so that the method will wait for integer loads and not wait for floating point loads.

4. The method of claim 1, wherein executing instructions involves keeping track of data dependencies to facilitate determining if an instruction is subject to an unresolved data dependency.

5. The method of claim 4, wherein keeping track of dependencies involves maintaining a "not-there" bit for each register, which indicates whether or not a value to be stored in a register by a preceding instruction is subject to an unresolved data dependency and is consequently not available; and
    wherein while executing an instruction during scout mode, the not-there bit for a destination register of the instruction is set if a value to be stored in the destination register is "not-ready," or if any source operand of the instruction is not-there.

6. The method of claim 1, wherein after a launch condition is finally resolved, the method further comprises using the checkpoint to resume execution in normal-execution mode from the instruction that originally encountered the launch condition.

7. The method of claim 1, wherein a launch condition can include:
 a data-dependent stall condition; or
 a non-data-dependent stall condition.

8. An apparatus that improves the effectiveness of prefetching during execution of instructions in scout mode, wherein the instructions are speculatively executed to prefetch future memory operations, but wherein results are not committed to the architectural state of a processor, the apparatus comprising:
 an execution mechanism configured to execute instructions for a program during a normal-execution mode;
 a code-modification mechanism, wherein while executing the instructions, the code-modification mechanism is configured to modify an executable file for the program so that selected loads will be executed as special loads, and wherein while modifying the executable file, the code modification mechanism is configured to:
  identify prefetch candidates, including loads which are likely to cause higher-level cache misses and unpredictable branches;
  identify prefetch-candidate-address loads, which are loads that retrieve data values used to generate addresses for the prefetch candidates; and to
  mark prefetch-candidate-address loads as a special load if the prefetch-candidate-address loads are likely to cause both a lower-level cache miss and a higher-level cache hit;
 wherein upon encountering a condition which causes the processor to enter scout mode, the execution mechanism is configured to perform a checkpoint and to commence execution of instructions in scout mode; and
 wherein during execution of a load instruction during scout mode,
  if the load instruction is a special load instruction and if the load instruction causes a lower-level cache miss, the execution mechanism is configured to wait for data to be returned from a higher-level cache before resuming execution of subsequent instructions in scout mode, instead of disregarding the result of the load instruction and immediately resuming execution in scout mode, whereby the data returned from the higher-level cache can help in generating prefetches during scout mode; and
  if the load instruction is not a special load instruction, the method further comprises waiting for data to be returned from a lower-level cache before resuming execution of subsequent instructions in scout mode.

9. The apparatus of claim 8, wherein a special load instruction is:
 a load instruction which has a different bit pattern than a normal load instruction;
 a load instruction which is located within a section of code that is marked as special; or
 a load instruction which is executed during a time period when process state information indicates that the load instruction is to be treated as a special load instruction.

10. The apparatus of claim 8, wherein only integer loads and not floating point loads are marked as special, so that the apparatus will wait for integer loads and not wait for floating point loads.

11. The apparatus of claim 8, wherein while executing instructions, the execution mechanism is configured to keep track of data dependencies to facilitate determining if an instruction is subject to an unresolved data dependency.

12. The apparatus of claim 11, wherein while keeping track of dependencies the execution mechanism is configured to maintain a "not-there" bit for each register, which indicates whether or not a value to be stored in a register by a preceding instruction is subject to an unresolved data dependency and is consequently not available; and
 wherein while executing an instruction during scout mode, the execution mechanism is configured to set the not-there bit for a destination register of the instruction if a value to be stored in the destination register is "not-ready," or if any source operand of the instruction is not-there.

13. The apparatus of claim 8, wherein after a launch condition is finally resolved, the execution mechanism is configured to use the checkpoint to resume execution in normal-execution mode from the instruction that originally encountered the launch condition.

14. The apparatus of claim 8, wherein a launch condition can include:
 a data-dependent stall condition; or
 a non-data-dependent stall condition.

15. A computer system containing a processor that improves the effectiveness of prefetching during execution of instructions in scout mode, wherein the instructions are speculatively executed to prefetch future memory operations, but wherein results are not committed to the architectural state of a processor, the computer system comprising:
 the processor;
 a memory;
 an execution mechanism within the processor configured to execute instructions for a program during a normal-execution mode;
 a code-modification mechanism, wherein while executing the instructions, the code-modification mechanism is configured to modify an executable file for the program so that selected loads will be executed as special loads, and wherein while modifying the executable file, the code modification mechanism is configured to:
  identify prefetch candidates, including loads which are likely to cause higher-level cache misses and unpredictable branches;
  identify prefetch-candidate-address loads, which are loads that retrieve data values used to generate addresses for the prefetch candidates; and to
  mark prefetch-candidate-address loads as a special load if the prefetch-candidate-address loads are likely to cause both a lower-level cache miss and a higher-level cache hit;
 wherein upon encountering a condition which causes the processor to enter scout mode, the execution mechanism is configured to perform a checkpoint and to commence execution of instructions in scout mode; and
 wherein during execution of a load instruction during scout mode,
  if the load instruction is a special load instruction and if the load instruction causes a lower-level cache miss, the execution mechanism is configured to wait for data to be returned from the higher-level cache before resuming execution of subsequent instructions in scout mode, instead of disregarding the result of the load instruction and immediately resuming execution in scout mode, whereby the data returned from the higher-level cache can help in generating prefetches during scout mode; and if the load instruction is not a special load instruction, the method further comprises waiting for data to be returned from a lower-level cache before resuming execution of subsequent instructions in scout mode.

16. The computer system of claim 15, wherein a special load instruction is:

a load instruction which has a different bit pattern than a normal load instruction;

a load instruction which is located within a section of code that is marked as special; or a load instruction which is executed during a time period when process state information indicates that the load instruction is to be treated as a special load instruction.

* * * * *